United States Patent Office 2,834,816
Patented May 13, 1958

2,834,816

PRODUCTION OF ISOPROPANOL BY HYDRATION WITH PROPYLENE RECYCLE

Norman Levy and Ronald Cooper Thomson, Norton-on-Tees, England, assignors to Imperial Chemical Industries Limited, a corporation of Great Britain No Drawing. Application January 4, 1954
Serial No. 402,164

Claims priority, application Great Britain April 13, 1949

4 Claims. (Cl. 260—641)

This invention relates to the recycling of the feed material in the direct catalytic hydration of propylene or a higher olefine to a corresponding alcohol, and has for its object to achieve such recycling with a minimum loss of reaction product, i. e. of alcohol, already produced.

In the process of direct catayltic hydration of an olefine, this olefine with an excess quantity of water is fed to a converter at elevated temperature and pressure, e. g. in the case of hydration of propylene to isopropanol, the temperature may be 270° C. and the pressure 250 atmospheres absolute, the reaction mixture being brought into contact in the converter with a suitable catalyst, such as an oxide of tungsten, whereupon part of it will combine to form the corresponding alcohol (a small amount of acetone and polymers being also formed as a rule).

In order to work this process economically, it is necessary to recycle the unreacted olefine. It was found experimentally that in the case of isopropanol production by hydration of propylene, the aqueous condensate from the converter, which was expected to contain, in solution, the isopropanol made, contained only about 80% of the isopropanol made, whereas the remainder of the isopropanol made, i. e. about 20% of it, together with all the polymer, was contained in the condensate of the propylene which had left the converter. It is highly desirable that this alcohol should be recovered from the olefine before recycling the latter, and it would further have seemed desirable to carry out the recovery step without any additional injection equipment.

The applicants, for this reason, attempted, in the example under consideration, to recover the isopropanol from the propylene by a crude fractionation at the pressure used in the converter. Contrary to expectation, however, it proved impossible to recover the alcohol in this way, although a large range of temperatures was tried (between 20° and 225° C.), the propylene containing between 35% and 75% by weight of isopropanol at temperatures of this range. These figures were very much higher than could have been expected from partial pressure considerations, assuming the olefine to be in the vapour phase. As a tentative explanation of this fact it is suggested that, in spite of the olefine being in the vapour phase, propylene over the temperature range considered still behaves like a liquid insofar as it exercises a marked solubility effect on isopropanol.

The applicants also attempted liquid-liquid separation of the propylene and the aqueous solution of the isopropanol, but found that, at 25° C. and at pressures down to 10 atmospheres, 25–30% of the isopropanol make remained in the propylene layer.

It was found that further cooling down of the liquid to −10° C. gave better results. The objection to this method of separation is expense, both in installing the necessary apparatus and in operation.

The same objection applies to water-washing of the mixtures, especially on the full scale.

According to the invention, there is provided a process for the production of isopropanol substantially free from propylene which comprises hydrating propylene in a reaction zone with water under elevated temperature and superatmospheric pressure in the vapour phase in the presence of a solid catalyst and of liquid water; taking off together from the hydration zone a mixed product consisting of (i) a vaporous mixture of propylene, isopropanol and steam, and (ii) of liquid comprising isopropanol and water; releasing the pressure over the mixed product to at most 25 atmospheres: and without addition of water, flash distilling the mixture in a vessel at a column head temperature just above the vaporisation temperature of propylene at the pressure employed, obtaining as overhead propylene, substantially free from isopropanol and as bottoms aqueous isopropanol, substantially free from propylene, and recycling the said propylene to the hydration reaction zone.

Propylene has a vapour pressure of about 10 atmospheres at room temperature, and it was found convenient to operate the column at a pressure of about 20 atmospheres. Pressures lower than this, down to the vapour pressure at room temperature of the feed material, may be used. The reason why it is preferred not to let down the propylene to its vapour pressure at room temperature it that it is easier to liquify it for recycling (without applying a very low temperature) if it is under a slightly raised pressure. It is to be understood that the use of an elevated reaction pressure makes it desirable, from a practical point of view, to inject the olefine in the liquid phase and vaporise it subsequently.

The column is preferably packed with eyelets or like packing material.

Under these conditions the distillation will proceed with a considerable amount of internal reflux, and it is found that, as a result, the reactant to be recycled leaves the distilling column with, at most, a small admixture (of a few percent) of the reaction product admixed.

In the experiments carried out with propylene directly hydrated to isopropanol, it was also tried still further to improve the separation of isopropanol from the propylene by providing for external reflux of the propylene into the column head. It was found that for reflux ratios below 0.6, i. e. weight of refluxed material below 60% of the weight of material finally taken off, the effect on the isopropanol content of the propylene taken off was insignificant. At higher reflux ratios the isopropanol content of the propylene taken off was in fact reduced, but even then only to a modest extent. As the propylene has to have its pressure raised for re-injection into the distilling column head, it it not, as a rule, considered economic to make use of this possibility of further reducing its isopropanol content.

The following are two examples of the results obtained during the operation of a distilling column according to this invention for separating isopropanol from propylene, (1) with no propylene reinjection and (2) with propylene reinjection to the column head at a reflux ratio, as above defined, above 0.6.

(1) A mixture of water and propylene, at a ratio, by weight, of 5.6:1, was preheated so as to vaporise all the propylene and part of the water, and the whole, partly gaseous and partly liquid, mixture was fed, by downward flow, to a converter charged with a pelleted tungstic oxide (approximately $W_2O_5$) catalyst at a rate of 0.49 kilogram of propylene per litre of space occupied by the catalyst per hour, or, in other words, 2.76 kilograms of water per litre of space occupied by the catalyst per hour, the temperature in the converter being 270° C. and the pressure 250 atmospheres absolute. It was found that the amount, by weight, of isopropanol produced in the converter in this way was 34.4% of the amount, by weight, of the propylene fed, i. e. about 168 grams per litre of catalyst space per hour. As 168 grams of isopropanol contain 50 grams of the constituents of water, the mixture from the converter must be assumed to be impoverished in water by this amount per litre of catalyst space per hour as compared with the mixture entering the converter, i. e. water leaves the converter at a rate of 2.71 kilograms per litre of space occupied by the catalyst per hour. Similarly, as 168 grams of isopropanol contain 118 grams of the constituents of propylene, the mixture from the converter must be assumed to be impoverished in propylene by this amount per litre of catalyst space per hour as compared with the mixture entering the converter, i. e. the propylene leaves the converter at a rate of 0.372 kilogram per litre of space occupied by the catalyst per hour.

The reaction mixture from the converter was let down to a pressure of 18 atmospheres absolute and fed to the bottom of a distilling column where the temperature was about 150° C., the column being packed with eyelets, and its top being kept at 60° C. The propylene left this column at the top, whereas an aqueous solution of isopropanol was taken off at the bottom.

The aqueous product from this column was found to contain 5.7% by weight of isopropanol.

This corresponds to 163 grams of isopropanol per litre of catalyst space per hour in the aqueous solution obtained from the column, or to a final conversion which may be expressed as 33.3% of isopropanol finally obtained over propylene initially fed to the converter, the remaining 5 grams of the 168 grams per litre of catalyst space per hour produced in the converter accompanying the propylene to be recycled. These 5 grams amounted to 3% of the total isoprepanol make, i. e. the recovery amounted to 97%. The isopropanol content of the propylene from the column was 1.35% by weight.

(2) A mixture of water and propylene, at a ratio, by weight, of 6:1, was preheated as in Example (1), and the whole, party gaseous and partly liquid, mixture was fed, by downward flow, to a converter at a rate of 0.36 kilogram of propylene per litre of space occupied by the catalyst per hour, or, in other words, 2.18 kilograms of water per litre of catalyst space per hour, the catalyst charge, temperature and pressure in the converter being the same as in Example (1). It was found that the amount, by weight, of isopropanol produced in the converter in this way was 29.2% of the amount, by weight, of the propylene fed, i. e. about 105 grams per litre of catalyst space per hour. As 105 grams of isopropanol contain 31.5 grams of the constituents of water, the mixture from the converter must be assumed to be impoverished in water by this amount per litre of catalyst space per hour as compared with the mixture entering the converter, i. e. water leaves the converter at a rate of 2.15 kilograms per litre of space occupied by the catalyst per hour.

Similarly, as 105 grams of isopropanol contain 73.5 grams of the constituents of propylene, the mixture from the converter must be assumed to be impoverished in propylene by this amount per litre of catalyst space per hour as compared with the mixture entering the converter, i. e. the propylene leaves the converter at a rate of 0.2865 kilogram per litre of space occupied by the catalyst per hour.

The reaction mixture from the converter was let down to a pressure of 23 atmospheres absolute and fed to the bottom of a distilling column where the temperature was about 150° C., the column being packed with eyelets, and its top being kept at 60° C. A reflux ratio of 0.68 was used i. e. the amount of propylene refluxed was 68% of the amount of propylene finally taken off at the column head.

The aqueous product of the distilling column was found to contain 4.61% by weight of isopropanol.

This corresponds to 104 grams of isopropanol per litre of catalyst space per hour in the aqueous solution obtained from the distilling column, or to a final conversion which may be expressed by 28.9% of isopropanol finally obtained over propylene initially fed to the converter, the remaining 1 gram out of the 105 grams per litre of catalyst space per hour produced in the converter accompanying the propylene to be recycled. This 1 gram amounted to 1% of the total isopropanol make, or the recovery amounted to 99%. The isopropanol content of the propylene from the distilling column was 0.35% by weight.

It should be understood that of the two temperatures quoted in the above example, viz, that at the bottom and that at the top of the column, only the latter is somewhat critical, being required to be just (e. g. by 5° C.) above the vaporization temperature of the propylene at the pressure employed in the still, and therefore lying preferably in the range of 50-60° C. The temperature at the bottom of the column should be considerably higher so as to provide a fairly large temperature gradient through the column, but temperature differences between top and bottom from a considerable range—say between 20° and 90° C.—are permissible.

The present application is a continuation-in-part of our copending application, Serial No. 152,257, filed March 27, 1950, and now abandoned.

We claim:

1. A process for the production of isopropanol substantially free from propylene which comprises hydrating propylene in a reaction zone with water under elevated temperature and superatmospheric pressure in the vapour phase in the presence of a solid catalyst and of liquid water; taking off together from the hydration zone a mixed product consisting of (i) a vaporous mixture of propylene, isopropanol and steam, and (ii) of liquid comprising isopropanol and water; releasing the pressure over the mixed product to between 10 and 25 atmospheres: and without addition of water, flash distilling the mixture in a vessel at a column head temperature just above the vaporisation temperature of propylene at the pressure employed, obtaining as overhead propylene at between 10 and 25 atmospheres, substantially free from isopropanol and as bottoms aqueous isopropanol, substantially free from propylene, condensing the propylene to the liquid state by cooling, recompressing and recycling the said propylene to the hydration reaction zone.

2. A process as recited in claim 1 in which said released pressure is within the range of from 20 to 25 atmospheres.

3. A process as recited in claim 1 in which propylene is externally refluxed to the distillation zone at a reflux ratio in excess of 0.6.

4. A process as recited in claim 1 in which said released pressure is about 20 atmospheres and the distillation zone is operated with a head temperature of about 60° C. and a bottom temperature of about 150° C.

References Cited in the file of this patent

UNITED STATES PATENTS

| | | |
|---|---|---|
| 1,873,536 | Brown et al. | Aug. 23, 1932 |
| 2,296,696 | Babcock | Sept. 22, 1942 |
| 2,536,768 | Reynolds et al. | Jan. 2, 1951 |

OTHER REFERENCES

Fiat Final Report No. 968, April 2, 1947, pp. 1, 2, 4 to 8, 10 to 12, 16, 19 and 28 to 31.